(12) United States Patent
Kuroda et al.

(10) Patent No.: US 9,717,990 B2
(45) Date of Patent: Aug. 1, 2017

(54) NETWORK GAME SYSTEM FOR EXECUTING EVENT IN NETWORK GAME

(71) Applicant: KABUSHIKI KAISHA SQUARE ENIX, Tokyo (JP)

(72) Inventors: Yoichi Kuroda, Tokyo (JP); Ryoko Kato, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 1 day.

(21) Appl. No.: 14/582,632

(22) Filed: Dec. 24, 2014

(65) Prior Publication Data

US 2015/0119143 A1  Apr. 30, 2015

Related U.S. Application Data

(63) Continuation of application No. 13/298,589, filed on Nov. 17, 2011, now Pat. No. 8,944,919.

(30) Foreign Application Priority Data

Dec. 7, 2010 (JP) ................................ P2010-272440

(51) Int. Cl.
*A63F 13/44* (2014.01)
*A63F 13/822* (2014.01)
(Continued)

(52) U.S. Cl.
CPC .............. *A63F 13/44* (2014.09); *A63F 13/12* (2013.01); *A63F 13/35* (2014.09); *A63F 13/493* (2014.09);
(Continued)

(58) Field of Classification Search
CPC .......... A63F 13/00; A63F 13/10; A63F 13/12; A63F 2300/407; A63F 2300/534;
(Continued)

(56) References Cited

U.S. PATENT DOCUMENTS 6,439,998 B1   8/2002 Itou
6,884,169 B2   4/2005 Tsuchida et al.
(Continued)

FOREIGN PATENT DOCUMENTS

EP   1086731   3/2001
EP   1733772   12/2006
(Continued)

OTHER PUBLICATIONS

Sega Megadrive / Genesis—John Madden Football 91 Uploaded by Willowbob Uploaded on Sep. 13, 2007 https://www.youtube.com/watch?v=_tBKNXEEQ9w.*
(Continued)

*Primary Examiner* — Kang Hu
*Assistant Examiner* — Jeffrey Wong
(74) *Attorney, Agent, or Firm* — Greenblum & Bernstein, P.L.C.

(57) ABSTRACT

A network game system includes a server apparatus and a plurality of video game apparatuses connected to the server apparatus. A party includes player characters of a plurality of players. When the party battles with an opponent character, the server apparatus simultaneously transmits movie playback information to each video game apparatus for starting playback of a movie. Each of the players can skip the movie at a desired timing. A screen is displayed on each video game apparatus that has skipped the movie until the battle starts. When information is received from each video game apparatus that indicates playback of the movie has ended, the server apparatus simultaneously transmits battle start information to each video game apparatus.

14 Claims, 8 Drawing Sheets

(51) Int. Cl.
*A63F 13/847* (2014.01)
*A63F 13/493* (2014.01)
*A63F 13/35* (2014.01)
*A63F 13/537* (2014.01)
*A63F 13/30* (2014.01)
*A63F 13/335* (2014.01)

(52) U.S. Cl.
CPC .......... *A63F 13/537* (2014.09); *A63F 13/822* (2014.09); *A63F 13/847* (2014.09); *A63F 13/335* (2014.09); *A63F 2300/407* (2013.01); *A63F 2300/534* (2013.01); *A63F 2300/5533* (2013.01); *A63F 2300/5566* (2013.01); *A63F 2300/5593* (2013.01); *A63F 2300/636* (2013.01); *A63F 2300/807* (2013.01); *A63F 2300/8029* (2013.01); *A63F 2300/8076* (2013.01)

(58) Field of Classification Search
CPC ...... A63F 2300/5533; A63F 2300/5566; A63F 2300/5593; A63F 2300/636; A63F 2300/8029; A63F 2300/807; A63F 2300/8076; A63F 13/44; A63F 13/35; A63F 13/493; A63F 13/537; A63F 13/822; A63F 13/847; A63F 13/335
See application file for complete search history.

(56) References Cited

U.S. PATENT DOCUMENTS

| | | | |
|---|---|---|---|
| 7,771,270 | B2 | 8/2010 | Kaminkow et al. |
| 8,246,454 | B2 | 8/2012 | Zalewski |
| 8,287,378 | B2 | 10/2012 | Ogawa |
| 2002/0034980 | A1* | 3/2002 | Lemmons et al. .............. 463/40 |
| 2004/0148221 | A1 | 7/2004 | Chu |
| 2004/0259636 | A1* | 12/2004 | Machida ................ A63F 13/10 463/30 |
| 2005/0039210 | A1 | 2/2005 | Dusenberry et al. |
| 2006/0030264 | A1* | 2/2006 | Morris ................... H04L 67/24 455/41.2 |
| 2008/0032799 | A1 | 2/2008 | Hamilton et al. |
| 2008/0096662 | A1 | 4/2008 | Kuwahara et al. |
| 2008/0200226 | A1* | 8/2008 | Ichimura ................ A63F 13/10 463/8 |
| 2008/0280684 | A1 | 11/2008 | McBride et al. |
| 2010/0248823 | A1 | 9/2010 | Smith |
| 2010/0273553 | A1 | 10/2010 | Zalewski |
| 2011/0250957 | A1 | 10/2011 | Suzuki et al. |

FOREIGN PATENT DOCUMENTS

| | | |
|---|---|---|
| JP | 09-155063 | 6/1997 |
| JP | 2002-253857 | 9/2002 |
| JP | 2004-008762 | 1/2004 |
| JP | 2008-099906 | 5/2008 |
| JP | 2010-200792 | 9/2010 |
| WO | 2009/158342 | 12/2009 |

OTHER PUBLICATIONS

Youtube—Lunar The Silver Star Story Complete gameplay Uploaded by MindInsurgance Sep. 5, 2009 https://www.youtube.com/watch?v=WHkax13ZhMBU.*

"Play Station—The Complete Supervision of Idea Factory—Spectral Force 2 Playing Guide Book", First Edition, Japan, T2 Publishing Co., Ltd., p. 111 (Nov. 20, 1998), along with a partial English language translation thereof.

Office Action from Japan Patent Office (JPO) in Japanese Patent Application No. 2013-051244, dated Jul. 1, 2014, along with a partial English language translation thereof.

Extended European Search Report from European Patent Office (EPO) in European Patent Application No. 11190164.1, dated Nov. 13, 2013.

Office Action from Japan Patent Office (JPO) in Japanese Patent Appl. No. 2014-206960, dated Jan. 12, 2016, together with an English language translation.

"Bits of Knowledge of MHP3", URL http://mh3weblog.blog88.fc2.com/blog-entry-1715.html (Jan. 6, 2016).

"[MHP3] Chaos 4 ninsyu ga Jikkyo! Mau ha Arashi, Kanaderu ha Saika no Shirabe ver.", YouTube, URL https://www.youtube.com/watch?v=nGGjAtflVeQ (Jan. 6, 2016).

"[MHP3] Amatsumagatsuchi 4 nin PT TA 57:06", YouTube, URL https://www.youtube.com/watch?v=j0_7AjJm9vw (Jan. 6, 2016).

Office Action from Japan Patent Office (JPO) in Japanese Patent Appl. No. 2014-206960, dated Oct. 4, 2016, together with a partial English language translation.

[MHP3] 41st Monhan Dodesyo 2ndS, YouTube (Sep. 26, 2016), available at https://www.youtube.com/watch?v=SPjH2SI0ENY.

* cited by examiner

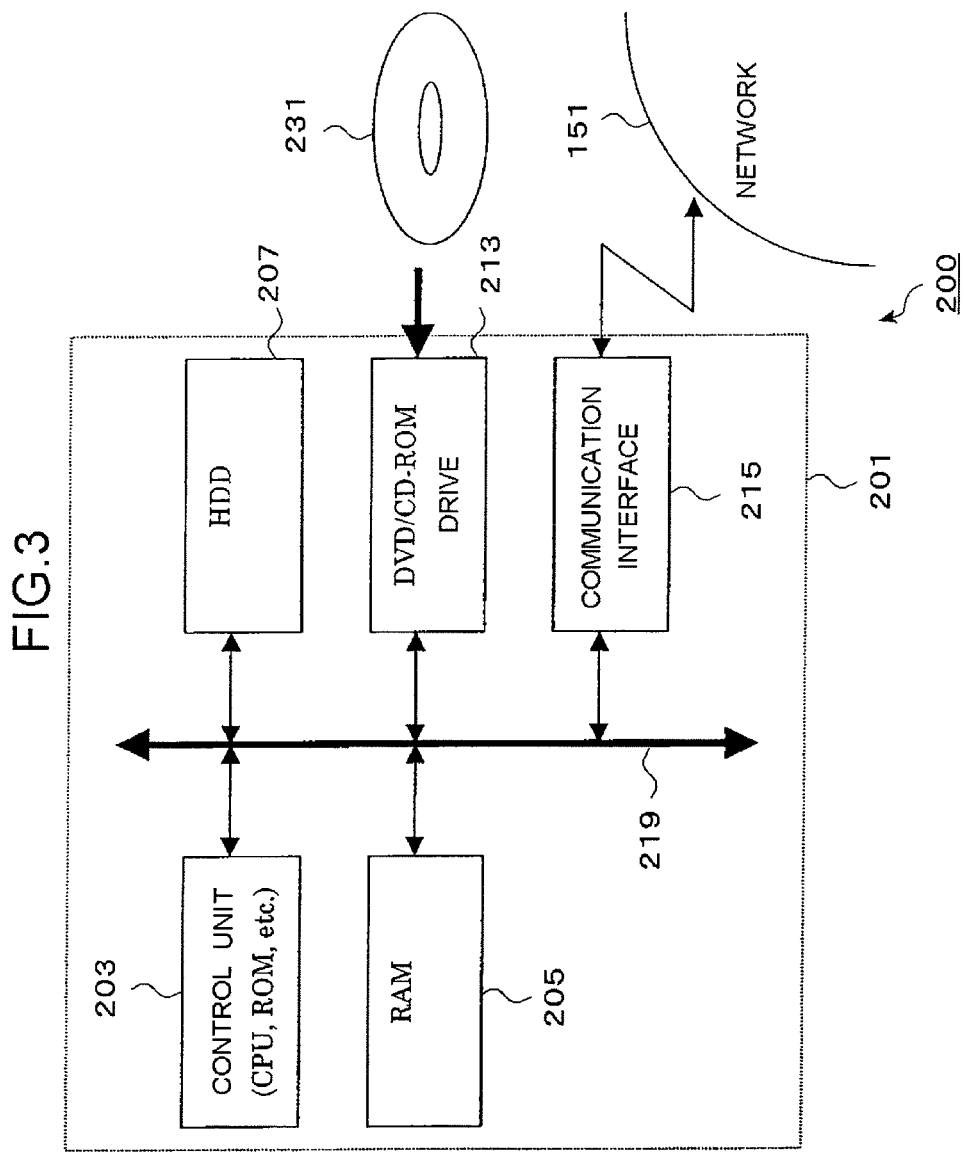

| PARTY ID | PARTICIPANT CHARACTER ID | BATTLE FLAG | BEFORE-BATTLE FLAG |
|---|---|---|---|
| A101 | 0001,0002,0003 | 1 | 1 |
| A102 |  | 0 | 0 |
| B101 |  | 1 | 0 |
| ⋮ | ⋮ | ⋮ | ⋮ |
| 401 | 402 | 403 | 404 |

| CHARACTER ID | DESTINATION | NAME | FORM | ATTRIBUTE | POSITION | HP |  | EQUIPMENT |  | MOVIE-ON FLAG |
|---|---|---|---|---|---|---|---|---|---|---|
| 0001 |  | CHARACTER A |  |  |  |  | .... |  | .... | 0 |
| 0002 |  | CHARACTER B |  |  |  |  | .... |  | .... | 0 |
| 0003 |  | CHARACTER C |  |  |  |  | .... |  | .... | 1 |
| 411 | 412 | 413 | 414 | 415 | 416 | 417 |  | 418 |  | 419 |

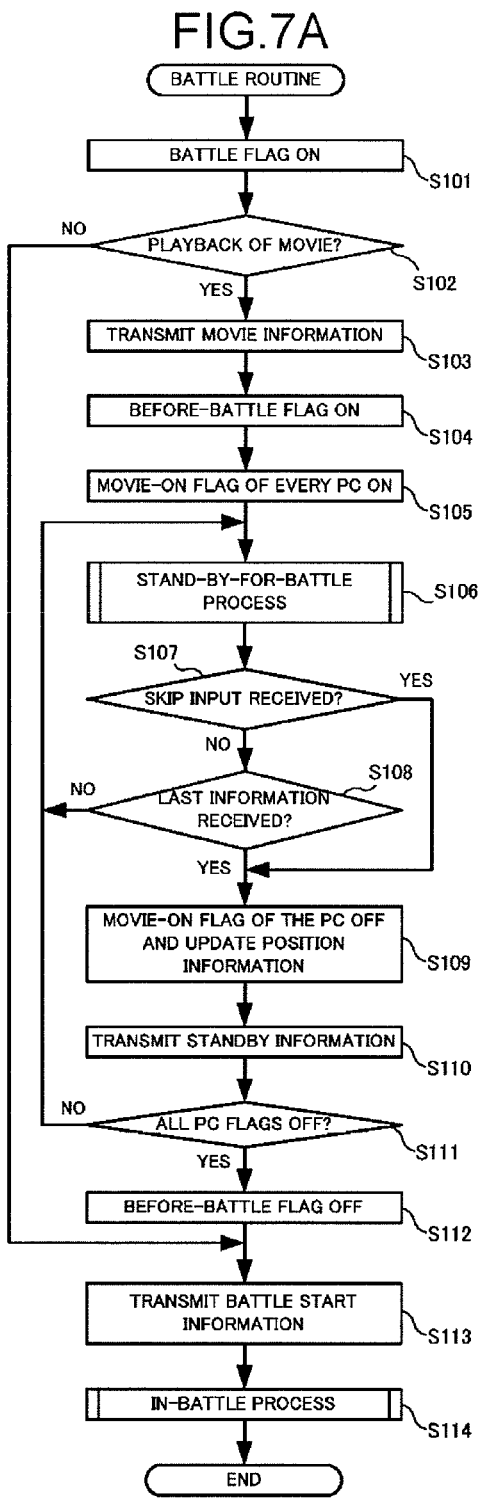

NETWORK GAME SYSTEM FOR EXECUTING EVENT IN NETWORK GAME

CROSS-REFERENCE TO RELATED APPLICATION

This is a continuation application of U.S. patent application Ser. No. 13/298,589, filed Nov. 17, 2011, which claims the benefit of Japanese Patent Application No. 2010-272440, filed on Dec. 7, 2010. The disclosure of each of the above-identified applications, including the specification, drawings, and claims, is incorporated herein by reference in its entirety.

BACKGROUND OF THE INVENTION

Field of the Invention

The present invention relates to a network game in which a plurality of players participate to progress with the game, and, more particularly, to execution of an event in which a plurality of players participate.

Description of the Related Art

The recent advancement on the network technology has made network games (online games) vivid in each of which a plurality of players participate to progress with the game. A system that executes a network game includes a server apparatus which is managed by one who runs the network game, and client devices of individual players which are connectable to the server apparatus over a network such as the Internet.

An RPG (Role Playing Game) among the network games progresses as multiple players participate in the game at the same time so that their player characters cooperate with one another to battle with an opponent character, or the players make their player characters battle with one another. Recently, in particular, an MMORPG (Massively Multi-player Online RPG) which permits participation of more players is becoming popular. A network game such as an MMORPG requires that the movements of the player characters of all the participating players should be transmitted to the client devices manipulated by the players without contradiction.

Japanese Patent Application Laid-Open Publication No. 2008-99906 discloses a technique of allowing a server apparatus to centralize management on the timings for the actions and processing of the player characters, and periodically synchronize with the timing of progressing the game. The technique disclosed in Japanese Patent Application Laid-Open Publication No. 2008-99906 prevents the individual client devices from processing time-sequential information with some delays which would bring about inconsistency on the progress of the game. This scheme can be adapted to processing of an event in which a plurality of players participate in a network game.

When an event occurs in a network game, a movie may be played back on the individual client devices as a previous step to the event so that the individual players watch the movie at the same time. In a network game such as an MMORPG in which multiple players participate, however, there are a variety of players including skilled or experienced players and beginners. In a case where experienced players and beginners participate in the same event, is likely that the experienced players have already seen such a movie so that they may feel tedious about being tied on watching the movie for a long time whereas the beginners are apt to see it for the first time.

From the viewpoint of just playing back a movie, the each client device may be permitted to freely skip the movie as each player is likely to skip some scenes in progressing with a stand-alone game, so that the player is relieved of a long tie-up. When an event such as a battle immediately follows the end of a movie, however, the timing for a process related to the event in the progress of the game may vary among the individual client devices. From the viewpoint of playing an event such as a battle with a plurality of players in cooperation, it is not desirable that while some players are watching a movie, the other players freely start the battle.

SUMMARY OF THE INVENTION

Accordingly, it is an object of the present invention to provide a network game system or the like that reliably restrains some of a plurality of players from freely playing an event in a game which should be played by the players together.

To achieve the object, according to one aspect of the invention, there is provided a network game system including a server apparatus, and a plurality of terminal apparatuses connected to the server apparatus over a network, wherein players who respectively use the terminal apparatuses cooperate to play an event in a game provided by the server apparatus.

The server apparatus includes an event occurrence information transmitter that transmits event generating information to each of the terminal apparatuses when a predetermined event generation condition is met in the game. The server apparatus also includes an end-of-preparation notifying information receiver that receives end-of-preparation notifying information transmitted from each of the terminal apparatuses. The server apparatus further includes an event start information transmitter that simultaneously transmits event start information to all of the terminal apparatuses on condition that the end-of-preparation notifying information receiver has received the end-of-preparation notifying information from all of the terminal apparatuses.

Each of the terminal apparatuses includes an event occurrence information receiver that receives the event occurrence information transmitted from the event occurrence information transmitter, and an event preparation image display that, upon reception of the event occurrence information at the event occurrence information receiver, performs a process of displaying an event preparation image enabling termination of display on a display device included in the terminal apparatus at a desired timing in response to a termination instruction from the player using the terminal apparatus. Each of the terminal apparatuses also includes an end-of-preparation notifying information transmitter that transmits the end-of-preparation notifying information to the server apparatus when display of the event preparation image is terminated. Each of the terminal apparatuses further includes an event start information receiver that receives the event start information transmitted from the event start information transmitter. Each of the terminal apparatuses further includes a standby process executing unit that executes a predetermined standby process until the event start information receiver receives the event start information after the end-of-preparation notifying information transmitter has transmitted the end-of-preparation notifying information. Each of the terminal apparatuses further includes an event transition unit that moves to a process of executing the event when the event start information receiver receives the event start information.

In the network game system, when each terminal apparatus receives event occurrence information transmitted from the server apparatus, the terminal apparatus displays an event preparation image on the display device included in each terminal apparatus. When the display of the event preparation image ends, each terminal apparatus transmits end-of-preparation notifying information to the server apparatus. On condition that the server apparatus receives this end-of-preparation notifying information from every terminal apparatus, the server apparatus simultaneously transmits event start information to all the terminal apparatuses, and each terminal apparatus having received the event start information goes to a process of playing the event.

While each player can terminate the display of the event preparation image on his/her own terminal apparatus at a desired timing, the event will not be played until the player receives event start information. This can assure that playing an event can be held until a plurality of players are ready to play it together. Each terminal apparatus performs a standby process until the terminal apparatus receives the event start information after the display of the event preparation image is terminated. Accordingly, a player who has terminated the display of the event preparation image may not be bored.

To achieve the object, a game apparatus according to a second aspect of the invention is a game apparatus among a plurality of game apparatuses connected to a server apparatus over a network, wherein a player who uses the game apparatus cooperates with players using other game apparatuses to play an event in a game provided by the server apparatus.

The game apparatus includes an event occurrence information receiver that receives event occurrence information transmitted from the server apparatus when a predetermined event generation condition is met in the game. The game apparatus also includes an event preparation image display that, upon reception of the event occurrence information at the event occurrence information receiver, performs a process of displaying an event preparation image enabling termination of display on a display device included in the game apparatus at a desired timing in response to a termination instruction from the player using the game apparatus. The game apparatus further includes an end-of-preparation notifying information transmitter that transmits the end-of-preparation notifying information to the server apparatus when display of the event preparation image is terminated. The game apparatus further includes an event start information receiver that receives event start information to be simultaneously transmitted to all of the game apparatuses on condition that the server apparatus has received the end-of-preparation notifying information from all of the game apparatuses. The game apparatus further includes a standby process executing unit that executes a predetermined standby process until the event start information receiver receives the event start information after the end-of-preparation notifying information transmitter has transmitted the end-of-preparation notifying information. The game apparatus further includes an event transition unit that moves to a process of executing the event when the event start information receiver receives the event start information.

To achieve the object, a recording medium according to a third aspect of the invention is a computer readable recording medium recording a program which is executed by each of a plurality of computers connected to a server apparatus over a network, and allows a player who uses the computer to cooperate with players using other computers in the plurality of computers to play an event in a game provided by the server apparatus.

The program allows the computer to function as an event occurrence information receiver that receives event occurrence information transmitted from the server apparatus when a predetermined event generation condition is met in the game. The program also allows the computer to function as an event preparation image display that, upon reception of the event occurrence information at the event occurrence information receiver, performs a process of displaying an event preparation image enabling termination of display on a display device included in the computer at a desired timing in response to a termination instruction from the player using the computer. The program further allows the computer to function as an end-of-preparation notifying information transmitter that transmits the end-of-preparation notifying information to the server apparatus when display of the event preparation image is terminated. The program further allows the computer to function as an event start information receiver that receives event start information to be simultaneously transmitted to all of the computers on condition that the server apparatus has received the end-of-preparation notifying information from all of the computers. The program further allows the computer to function as a standby process executing unit that executes a predetermined standby process until the event start information receiver receives the event start information after the end-of-preparation notifying information transmitter has transmitted the end-of-preparation notifying information. The program further allows the computer to function as an event transition unit that moves to a process of executing the event when the event start information receiver receives the event start information.

BRIEF DESCRIPTION OF THE DRAWINGS

FIG. 3 is a block diagram showing the configuration of a server apparatus shown in FIG. 1.

FIG. 7A is a flowchart illustrating a routine which is executed by the server apparatus.

BEST MODE FOR CARRYING OUT THE INVENTION

An embodiment of the invention will now be described with reference to the accompanying drawings.

A network game according to the embodiment is an MMORPG which progresses as a plurality of players who participate in the network game at the same time cause their own player characters in a battle field as virtual space to battle with an opponent character present in the field. In this network game, a player forms a party of a plurality of player characters composed of the player's own player character and player characters of the other players. A plurality of player characters belonging to the party co-progress with the battle.

Figure 1:
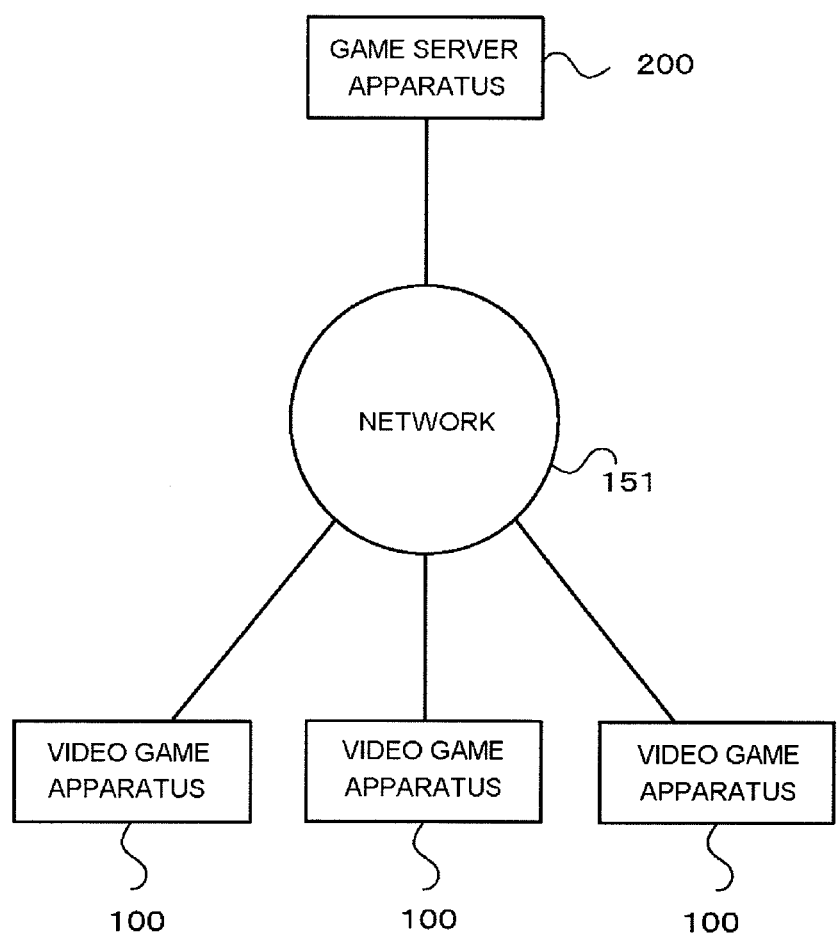
FIG. 1 is a block diagram showing the configuration of a network game system according to an embodiment of the invention.

FIG. 1 is a block diagram showing the general configuration of a network system where a network game according to this embodiment is played. As illustrated, the network system includes a plurality of video game apparatuses 100 connected to a server apparatus 200 over a network 151 like the Internet.

Figure 2:
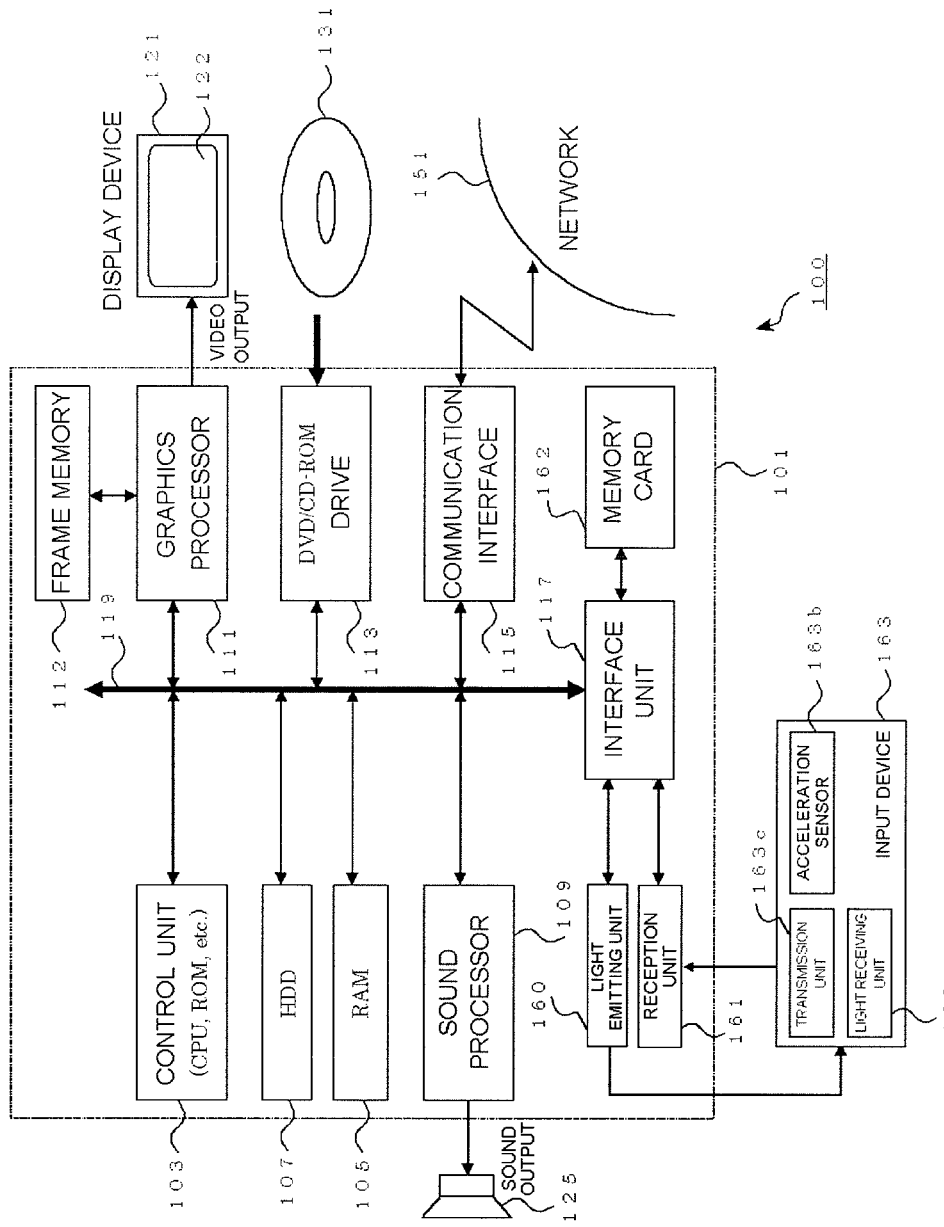
FIG. 2 is a block diagram showing the configuration of a video game apparatus shown in FIG. 1.

FIG. 2 is a block diagram showing the configuration of the video game apparatus 100 shown in FIG. 1. As illustrated, the video game apparatus 100 has a main body 101 as its main unit. The main body 101 includes a control unit 103, a RAM (Random Access Memory) 105, a hard disk drive (HDD) 107, a sound processor 109, a graphics processor 111, a DVD/CD-ROM drive 113, a communication interface 115, and an interface unit 117, all of which are connected to an internal bus 119.

The sound processor 109 of the main body 101 is connected to a sound output device 125 or a speaker, and the graphics processor 111 is connected to a display device 121 having a display screen 122. A recording medium (in this embodiment, DVD-ROM or CD-ROM) 131 is mountable in the DVD/CD-ROM drive 113. The communication interface 115 is connected to the network 151. A light emitting unit 160, a reception unit 161, and a memory card 162 are connected to the interface unit 117.

The control unit 103 includes a CPU (Central Processing Unit), and a ROM (Read Only Memory), and executes a program stored in the HDD 107 or on the recording medium 131 to control the main body 101. The control unit 103 includes an internal timer. The RAM 105 is used as a work area for the control unit 103, and temporarily stores information on the positions of player characters to be described later, HP (Hit Point which will be described later), etc. The HDD 107 is a storage area for storing programs and data. When instructed to output sounds by a program which is being executed by the control unit 103, the sound processor 109 interprets the instruction and outputs sound signals to the sound output device 125.

The graphics processor 111 maps image data in a frame memory 112 (which is shown outside the graphics processor 111 in FIG. 2 but is actually provided in a RAM included in a chip composing the graphics processor 111) in accordance with a drawing instruction output from the control unit 103, and outputs video signals to display images on the display screen 122 of the display device 121. One frame time of images in the video signals output from the graphics processor 111 is, for example, 1/30 sec. There are two sets of frame memories 112, one for writing and the other for reading, which are switched from one to the other for each frame period.

The DVD/CD-ROM drive 113 reads out programs and data from the recording medium 131. The communication interface 115 is connected to the network 151 to communicate with other computers. The light emitting unit 160 includes a plurality of LEDs having light irradiating directions different from one another, and is located in a position having a predetermined relation with the display device 121 (above or under the display device 121).

The input device 163 includes a light receiver 163a, an acceleration sensor 163b, and a transmission unit 163c. The light receiver 163a receives light emitted from each LED included in the light emitting unit 160. The number and positions of LEDs whose lights can be received by the light receiver 163a vary depending on the direction of the input device 163. The acceleration sensor 163b includes a multi-axis acceleration sensor having three or more axes, and detects the inclination and three-dimensional motion of the input device 163. The input device 163 has directional keys and a plurality of operation buttons.

The transmission unit 163c transmits an infrared signal according to the condition of the input device 163, more specifically, according to the inclination of the input device 163 and the direction and speed of the motion of the input device 163 which are detected by the acceleration sensor 163b, and inputs from the directional keys and the operation buttons of the input device 163. The infrared signal transmitted from the transmission unit 163c is received by the reception unit 161 as input data from the input device 163.

The interface unit 117 outputs input data received by the input unit 161 to the RAM 105. The control unit 103 interprets the input data and performs an arithmetic operation. In response to an instruction from the control unit 103, the interface unit 117 stores data representing the progress state of the game stored in the RAM 105 in the memory card 162, and reads out data on the game stored in the memory card 162 at the time the game has been suspended, and transmits the data to the RAM 105. Though not shown, a keyboard is used as the input device to input characters in a chat function to be described later. The keyboard may be of a type which inputs a signal to the interface unit 117 via the input device 163, or of a type which directly inputs a signal to the interface unit 117.

The programs and data for playing the game on the video game apparatus 100, and data on a movie itself, etc. are initially stored in, for example, the recording medium 131. The programs and data for the game, and data on a movie itself, etc. stored in the recording medium 131 are read out by the DVD/CD-ROM drive 113 and are loaded onto the RAM 105 at the time of execution. The control unit 103 processes the programs and data loaded onto the RAM 105, outputs a drawing instruction to the graphics processor 111, and outputs a sound output instruction to the sound processor 109. Intermediate data which is produced while the control unit 103 is performing the processing is stored in the RAM 105.

FIG. 3 is a block diagram showing the configuration of the server apparatus 200 shown in FIG. 1. As shown, the server apparatus 200 has a main body 201 as its main unit. The main body 201 includes a control unit 203, a RAM 205, a hard disk drive (HDD) 207, a DVD/CD-ROM drive 213, and a communication interface 215, all of which are connected to an internal bus 219. A recording medium (DVD-ROM or CD-ROM) 231 is mounted in the DVD/CD-ROM drive 213.

The control unit 203 includes a CPU and a ROM, and executes a program stored in the HDD 207 or on the recording medium 231 to control the server apparatus 200. The control unit 203 includes an internal timer that measures a current time. The RAM 205 is used as a work area for the control unit 203. The HDD 207 is a storage area for storing programs or data. The communication interface 215 is connected to the network 151 to communicate with each video game apparatus 100.

The programs and data for playing a network game on the server apparatus 200 are initially stored in, for example, the recording medium 231, and are installed in the HDD 207 therefrom. The programs and data are read out from the HDD 207 and are loaded onto the RAM 205 at the time of execution. The control unit 203 processes the programs and data loaded onto the RAM 205, and progresses with the network game based on data transmitted from each video game apparatus 100. Intermediate data which is produced while the control unit 203 is performing the processing is stored in the RAM 205.

The following will explain a battle on a battle field in the network game according to the embodiment. A plurality of player characters forming a plurality of parties, and a plurality of opponent characters are present on the field in the network game. A battle between player characters and an opponent character (the following description will be given of a case where the number of opponent characters in one battle according to the embodiment is one) takes place on a battle field. When a plurality of player characters compose a party, a battle with an opponent character is fought between the party and the opponent character.

In the battle, each player character and the opponent character fight against each other, and the HP (Hit Point which will be discussed later) of each player character and the HP of the opponent character decrease every time they are attacked. Any player character or the opponent character whose HP becomes 0 is disabled. When the HP of the opponent character becomes 0, disabling the opponent character, the player characters win the battle with, and can engage in a battle with a new opponent character.

A battle may be fought with an intermission of a given period during which a movie is played back. This movie is a dynamic image relating to a battle which follows the termination of the movie, so that each player will watch the movie on his/her own video game apparatus 100. When the movie terminates, each player is placed on the battle field to engage in the battle with the opponent character.

Each player may stop playing back the movie by operating the input device 163 before the given period elapses. The termination of the playback of a movie without waiting for the elapse of the given period is called skipping a movie. The player character of a player who performs its an operation to skip the movie is placed on the battle field before those of players who have not yet stopped playing back the movie. The player characters of the players who have not yet stopped playing back the movie stay posted off the battle field. The display screen 122 of the video game apparatus 100 which has skipped the movie shows how individual player characters are placed on the battle field.

The player character which is associated with the video game apparatus 100 which has skipped the movie moves into the battle field from outside thereof. At this time, the display screen 122 of the video game apparatus 100 that is associated with the player character which has already skipped the movie earlier and has been placed on the battle field shows how the player characters moving onto the battle field from outside thereof appear. Differences in the player characters on the battle field and in the player characters outside the battle field, both on the display screen 122, and how those player characters are moving thereon will be described in detail in the description of specific examples of the display screen 122 which will be given later.

The position of a player character on the battle field in a battle (hereinafter referred to as "battle position") will be described. The battle position is determined in the order of the individual video game apparatuses 100 which terminate the movie (specifically, in the order the server apparatus 200 receives information on the termination of the movie (skip input, information on the end of the movie to be described later)). The battle position will be described below on a case where three player characters compose a party.

A first player character associated with the video game apparatus 100 which has skipped the movie earliest and a third player character associated with the video game apparatus 100 which has played back the movie till the latest time are posted at battle positions far from the opponent character. A second player character associated with the video game apparatus 100 which has skipped the movie next to the first player character is posted at a battle position close to the opponent character.

As the individual players are placed at battle positions at different distances from the opponent character in a battle this way, the frequency of attacks on each player character by the opponent character in an actual battle and the damage level of an attack on each player character by the opponent character (the amount of reduction in HP in a single attack) vary. The second player character close to the opponent character has a high frequency of attacks by the opponent character and a high damage level, whereas the first and third player characters far from the opponent character have low frequencies of attacks by the opponent character and low damage levels.

When a player skips the movie quickest or plays it back till the latest time, the player can place his/her own player character at an advantageous battle position with respect to the opponent character. On the other hand, when a player skips the movie next to the quickest player, the player places his/her own player character at a disadvantageous battle position.

An advantage/disadvantage in a battle may be determined by which one of attributes, fire, water or wind, each player and an opponent character have. For example, an opponent character which has the attribute of fire has a high damage level on a player character having the attribute of water, and a low damage level on a player character having the attribute of wind. An opponent character which has the attribute of wind has a high damage level on a player character having the attribute of fire, and having a low damage level on a player character which has the attribute of water. This is true of the damage level of a player character on an opponent character.

The attributes of fire, water and wind have what is called three-way standoff (each attribute is advantageous and disadvantageous over the other two attributes, respectively). Even if the battle position at a close battle distance is disadvantageous for a player character over the opponent character, therefore, when the attribute of the player character is advantageous over the attribute of the opponent character (e.g., when the player character has the attribute of fire whereas the opponent character has the attribute of water), the positioning of the player character at a battle position close to the opponent character should not necessarily be disadvantageous over the opponent character.

In case of a first battle with an opponent character, such an attribute of the opponent character may be found out when player characters which have all the three attributes actually engage in the battle with the opponent character and attack on the opponent character (from the high/low damage levels), but cannot be known before the battle starts. However, each player may have an opportunity in viewing a hint, or a video image suggesting which attribute the opponent character has in a movie played back by each video game apparatus 100 before the battle.

Because such a hint in a movie cannot be viewed naturally if a player performs a skip operation before the hint is shown in the movie, an early skip operation to get an advantageous battle position results in missing the hint, and hesitating to perform a skip operation not to miss the hint is likely to miss an advantageous battle position. Specific examples of the timing of displaying such a hint will be discussed in the later description of specific examples of display screens.

A player character which has terminated the playback of a movie earlier and is placed on the battle field will stand by until the playback of the movie is terminated on the video game apparatuses 100 of all the player characters composing the party and all the player characters are placed on the battle field. In the standby mode, a player can manipulate the input device to have a chat using a chat function provided in the network game.

In standby mode, each player can change the equipment (e.g., a weapon or protective equipment) of his/her player character, or practice the movement of the player character in a battle (e.g., practice of what is called a deadly skill or the like). Changing the equipment of a player character can suppress the amount of reduction in its own HP by a single attack by the opponent character, or increase the amount of reduction in HP of the opponent character. As for a party composed of three or more player characters, two player characters may simultaneously enter the standby mode until a battle starts, the action of each of the other player characters is controlled by the video game apparatus 100 of that player character except for the action into the battle field originated from the termination of the movie, and is not affected at all by the operations of the players associated with the other player characters in standby mode.

Figures 4A, 4B, 5:
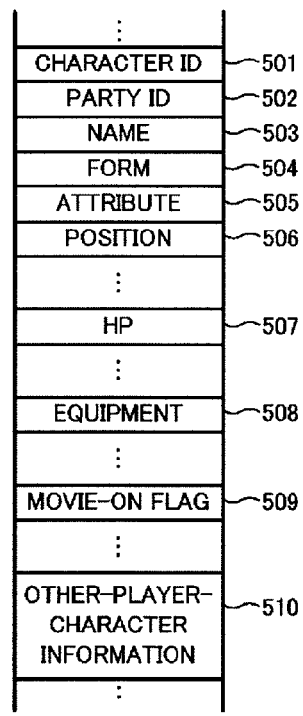
FIGS. 4A and 4B are diagrams showing tables which are managed by the server apparatus shown in FIGS. 1 and 3.
FIG. 5 is a diagram showing the structure of data stored in the video game apparatus shown in FIGS. 1 and 2.

A description will be given of data which is managed by the server apparatus 200 and data which is stored in the video game apparatus 100 for the progress of the network game according to the embodiment. FIGS. 4A and 4B are diagrams showing tables which are managed by the server apparatus 200 to execute the network game according to the embodiment.

FIG. 4A shows a party management table 400 managing statuses for individual parties present in the network game according to the embodiment. FIG. 4B shows a character management table 410 which is generated for each party and manages information on the positions, appearances, etc. of characters composing the party.

A party ID 401, a participant character ID 402, a battle flag 403, and a before-battle flag 404 are stored in the party management table 400 shown in FIG. 4A for each party. The party ID 401 is identifying information for uniquely identifying each party present on the field. The participant character ID 402 indicates character IDs (to be described later) of all player characters composing the party. The battle flag 403 indicates whether a party is restricted by a process (including a battle itself and playback of a movie) relating to a battle, and is ON (1) during a battle, and is OFF (0) otherwise.

The before-battle flag 404 indicates whether any player character associated with a the video game apparatus 100 which is playing back a movie is present in the player characters composing the party. The before-battle flag 404 is ON (1) when such a player character is present, and is OFF (0) otherwise. Because playback of a movie is carried out as a previous step to a battle, the battle flag 403 is always ON when the before-battle flag 404 is ON, so that the before-battle flag 404 will not be ON when the battle flag 403 is OFF.

A character ID 411, a destination address 412, name information 413, form information 414, attribute information 415, position information 416, HP information 417, equipment information 418, and a movie-ON flag 419 are stored in the character management table 410 shown in FIG. 4B for each character composing the party.

The character ID 411 is identifying information for uniquely identifying each player character present on the field. The destination address 412 represents an IP address assigned to specify the video game apparatus 100 which manipulates each respective player character. The name information 413 is used as information for displaying the name of a player character on the display screen 122. The form information 414 is information used to represent the appearance (build, face, etc.) of a player character on the field.

The attribute information 415 is information representing which one of the attributes, fire, water or wind, a player character has. The position information 416 is information representing a battle position on the field or the battle field. The HP information 417 is information representing the value of the HP of the player character.

The equipment information 418 represents information on a weapon or the like equipped on the player character, and allows the player to see the appearance of the player character equipped with the weapon or the like (equipped with a sword, wearing a helmet, or the like) on the display screen 122. The movie-ON flag 419 is information representing whether the video game apparatus 100 manipulating each respective player character is playing back a movie. The movie-ON flag 419 is ON (1) when the movie is being played back, and is OFF (0) when the movie is terminated.

As information for playing back a movie on each video game apparatus 100 is transmitted, the movie-ON flag 419 associated with all the video game apparatuses 100 is updated to "1". As the server apparatus 200 receives information indicating that an input on skipping has been input from each video game apparatus 100 or information indicating that a movie has been played back to the end, the movie-ON flag 419 of said each video game apparatus 100 is updated to "0".

FIG. 5 is a diagram showing the structure of data stored in the video game apparatus 100. A character ID 501, a party ID 502, name information 503, form information 504, attribute information 505, position information 506, HP information 507, equipment information 508, a movie-ON flag 509, and other-player-character information 510 are stored in the video game apparatus 100.

The character ID 501 is unique to the player character which is manipulated by the video game apparatus 100 where the character ID 501 is stored, and is the same as the character ID 411 stored in the character management table 410. The character ID 501 and the character ID 411 uniquely specify a player character on a field and a battle field, and a video game apparatus 100 manipulating the player character.

The party ID 502 is the ID of a party composed of the player character which is manipulated by this video game apparatus 100 as a member, and corresponds to the party ID 401 stored in the party management table 400. This corresponding relation can uniquely specify to which party the player character of the video game apparatus 100 belongs. The name information 503, the form information 504, the attribute information 505, the position information 506, the HP information 507, and the equipment information 508 have the same contents as those pieces of information stored in the character management table 410, so that exchanging information between the video game apparatus 100 and the server apparatus 200 allow those two groups of information to be consistent with each other during the progress of the game.

The movie-ON flag 509 is updated to "1" by reception of information for playing back a movie transmitted from the server apparatus 200, and updated to "0" as information indicating that a movie will be played back is skipped, or a movie has been played back to the end.

The other-player-character information 510 is data needed to display player characters other than a local player character on the display screen 122 of each video game apparatus 100, and represents information on other player characters transmitted from the server apparatus 200. Information on other player characters composing the same party is managed as the other-player-character information 510 for each player character in the character management table 410 transmitted from the server apparatus 200. The other-player-character information 510 includes the same pieces of information as the character ID 411, the destination address 412, the name information 413, the form information 414, the position information 416, the equipment information 418, and the movie-ON flag 419 for each of the other player characters belonging to the same party.

The progress of the network game according to the embodiment, and the flow of data in the network game will be described. A party composed of a plurality of player characters in this network game will battle with an opponent character on a battle field. While this battle may be started after playback of a movie on the video game apparatus 100 which manipulates each respective player character, each player can skip the movie on his/her own video game apparatus 100.

Even when a player skips a movie on his/her own video game apparatus 100, a video game apparatus 100 which manipulates another player character composing the party may still be playing back the movie. The battle following the movie will not start until the movie is terminated (regardless of the movie's being skipped or being played back to the end) on the video game apparatuses 100 of all the player characters composing the party, and the player character of any video game apparatus 100 which has terminated the movie is set in standby mode.

FIGS. 6A to 6E illustrate the flow of data from the point when playback of a movie has started before a battle till the point when playback of the movie is terminated on the video game apparatuses 100 of all the player characters composing the party. It is assumed herein that the video game apparatuses 100 of a party composed of three player characters terminate the movie in order (not simultaneously).

Figure 6A:
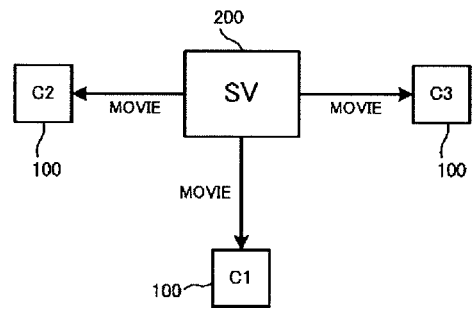
FIGS. 6A to 6E are diagrams exemplarily illustrating the progress of a network game according to the embodiment of the invention, and the flow of data associated with the progress of the game.
Figure 6B:
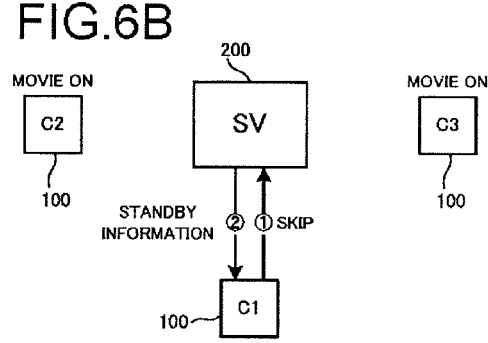

As shown in FIG. 6A, information for causing each video game apparatus 100 to play back a movie (hereinafter, movie playback information) is transmitted from the server apparatus 200. As a result, after the playback of the movie has started, the player character of one video game apparatus 100 performs an operation to skip the movie in playback first, as shown in FIG. 6B, information on a skip input originated from the operation (hereinafter, skip input information) is transmitted to the server apparatus 200 from the video game apparatus 100.

When the server apparatus 200 receives the first movie skip input information, standby information including the character IDs 411, the destination addresses 412, the name information 413, the form information 414, the equipment information 418, and the movie-ON flag 419 of other player characters composing the same party (hereinafter simply "standby information"), and the position information 416 which is updated to position information associated with the battle position of the local player character according to the order in which the movie has been terminated are transmitted from the server apparatus 200 to the video game apparatus 100 which has transmitted the skip input information. In this case, because this video game apparatus 100 has terminated the movie earliest, the video game apparatus 100 receives the position information 416 updated to position information of a battle position distant from the opponent character.

Figure 6C:
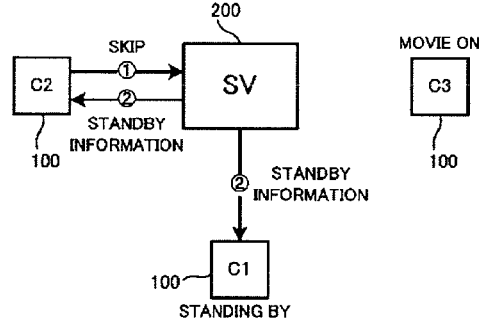

When a second movie skipping operation is performed on a video game apparatus 100 which manipulates another player character composing the same party, as shown in FIG. 6C, the skip input information is transmitted to the server apparatus 200 from this video game apparatus 100. The server apparatus 200 which has received the skip input information transmits standby information including the position information 416 updated with position information on battle positions according to the order in which the movie has been terminated to the video game apparatus 100 which has skipped the movie and the video game apparatus 100 which has skipped the movie previously. Because this is the second termination of the movie to the previous termination of the movie done by the first video game apparatus 100, the video game apparatus 100 which has transmitted this skip input information receives position information representing a battle position close to the opponent character.

Figure 6D:
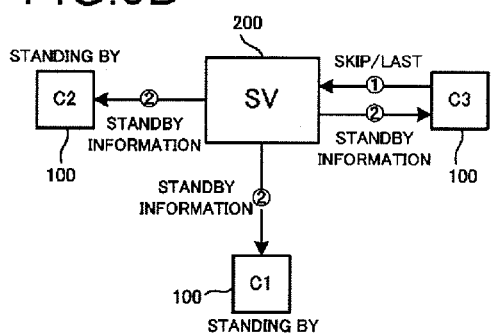

As shown in FIG. 6D, skip input information associated with a last movie skipping operation, or end-of-movie information originated from the movie's being viewed to the end is transmitted to the server apparatus 200 from a video game apparatus 100 which has played back the movie to the end. The server apparatus 200 which has received the skip input information transmits standby information including the position information 416 updated with position information on battle positions according to the order in which the movie has been terminated to all the video game apparatuses 100. Because this is the last termination of the movie, the video game apparatus 100 which has terminated the movie last receives position information representing a battle position distant from the opponent character.

Figure 6E:
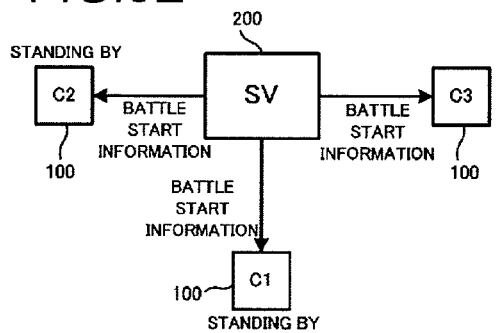

As the video game apparatuses 100 associated with all the other player characters composing the same party have terminated playing back the movie, the battle will start. In starting the battle, to allow all the video game apparatuses 100 to execute a process associated with the battle at the same time, battle start information is transmitted to all the video game apparatuses 100 from the server apparatus 200 after a given period of time elapses from the transmission of the last standby information, as shown in FIG. 6E.

Figure 7B:
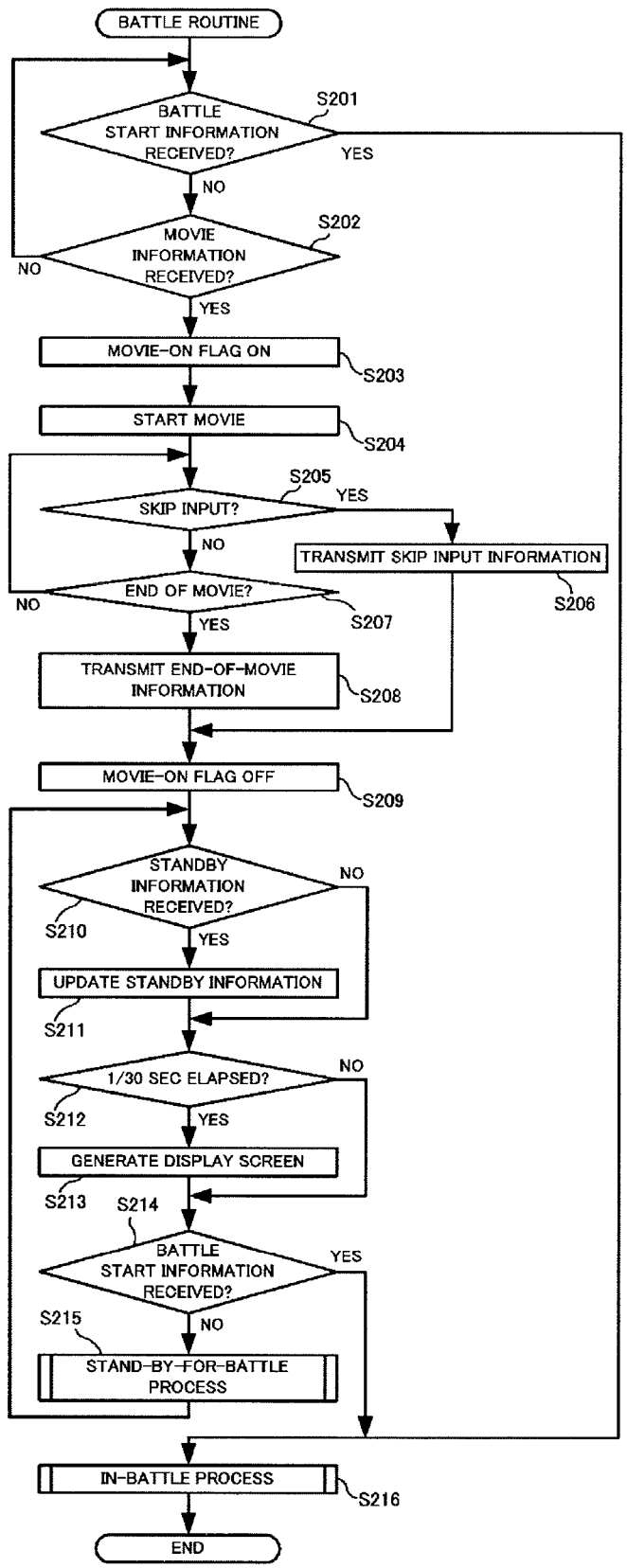
FIG. 7B is a flowchart illustrating a routine which is executed by the video game apparatus.

The following will describe routines which are respectively executed by the server apparatus 200 and the video game apparatuses 100 which are included in the network game system according to the embodiment. FIG. 7A is a flowchart illustrating a battle routine which is executed by the server apparatus 200, and FIG. 7B is a flowchart illustrating a battle routine which is executed by the video game apparatuses 100.

As shown in FIG. 7A, in the battle routine of the server apparatus 200, the control unit 203 of the server apparatus 200 sets the battle flag 403 stored in the party management table 400 ON (updates the flag to "1") for the party which engages in the battle associated with the battle routine (step S101). The control unit 203 determines whether a movie is played back in the battle (step S102). When a movie is played back in the battle, movie playback information for playing back the movie on the video game apparatuses 100 at the same time is transmitted to the video game apparatuses 100 associated with all the player characters composing the party which engages in the battle (step S103). Movie playback information used herein is not data on a movie itself, but information for playing back the movie which is stored in the recording medium 131 of each video game apparatus 100.

When the movie playback information is transmitted, the control unit 203 sets the before-battle flag 404 stored in the party management table 400 ON (updates the flag to "1") for the party which engages in the battle (step S104). The control unit 203 sets the movie-ON flags 419 stored in the character management table 410 ON (updates the flag to "1") for all the player characters in the party (step S105).

Then, the control unit 203 performs a stand-by-for-battle process (step S106). In the stand-by-for-battle process, a process to be executed in connection to the video game apparatus 100 which has skipped the movie earlier and is in standby mode until the battle starts (until playback of the movie is terminated on every video game apparatus 100) when playback of the movie has not terminated on every video game apparatus 100 yet is carried out. For example, a process associated with transmission/reception of messages in a chat with the chat function is executed, or when the equipment of a player character has been changed, reception of data on a change in the contents of the equipment information 418 stored in the character management table 410 of the server apparatus 200 or a process of changing the contents is carried out to change the contents.

After the stand-by-for-battle process in step S106, the control unit 203 determines whether skip input information associated with a movie skipping operation performed by a player is received (step S107). When having determined that skip input information has not been received yet, the control unit 203 determines whether end-of-movie information transmitted from any video game apparatus 100 as a consequence of the movie's having been played back to the end and finished without being skipped is received (step S108). When having determined that the end-of-movie information has not been received yet too, the control unit 203 returns to step S106.

When it is determined in step S107 that the skip input information is received, or when it is determined in step S108 that the end-of-movie information is received, the control unit 203 sets the movie-ON flag 419 stored in the character management table 410 OFF (updates the flag to "0") for the player character of the video game apparatus 100 which has transmitted the received information (step S109). The control unit 203 updates the position information 416 stored in the character management table 410 with position information of a battle position which is decided based on the order of terminating the movie.

The control unit 203 transmits standby information in the updated character management table 410 to the video game apparatuses 100 associated with all the player characters in standby mode (step S110). The control unit 203 determines whether the movie-ON flag 419 stored in the character management table 410 is OFF (updated with "0") for all the player characters composing the party (step S111). When it is determined that the movie-ON flag 419 is not OFF for all the player characters, the control unit 203 returns to step S106.

When it is determined that the movie-ON flag 419 is OFF for all the player characters, the control unit 203 resets the before-battle flag 404 stored in the party management table 400 OFF (updated with "0") (step S112). When a given period of time elapses after the before-battle flag 404 is set OFF in step S112, or after it is determined in step S102 that playback of a movie will not be executed in the battle, the control unit 203 simultaneously transmits battle start information for executing an in-battle process to the video game apparatuses 100 associated with all the player characters composing the party which engages in the battle (step S113). The control unit 203 executes the in-battle process (step S114), and terminates the actual process which is associated with the battle. Because this in-battle process is not related to the invention, its description will be omitted.

As shown in FIG. 7B, in the battle process of the video game apparatus 100, the control unit 103 of the video game apparatus 100 determines whether the video game apparatus 100 has received the battle start information transmitted from the server apparatus 200 (step S201). When having determined that the battle start information has not been received yet, the control unit 103 determines whether the movie playback information transmitted from the server apparatus 200 has been received (step S202). When having determined that the movie playback information has not been received too, the control unit 103 returns to step S201.

When having determined that the movie playback information has been received, the control unit 103 sets the movie-ON flag 509 stored in the video game apparatus 100 ON (updates the flag to "1") (step S203). Then, the control unit 103 starts playing back the movie in response to an instruction indicated by the received movie playback information to play back the movie (step S204). The control unit 103 determines whether the player has performed a movie skipping operation to enter a movie skip input (step S205). When having determined that there is the skip input, the control unit 103 transmits skip input information to the server apparatus 200 (step S206).

When having determined that there is no skip input, the control unit 103 determines whether the movie has been played back to the end (step S207). When having determined that the movie has not been played back to the end, the control unit 103 returns to step S205. When having determined that the movie has been played back to the end, the control unit 103 transmits end-of-movie information to the server apparatus 200 (step S208).

After the end-of-movie information is transmitted as a result of the movie's having been played back to the end, or after the skip input information is transmitted in step S206, the control unit 103 resets the movie-ON flag 509 stored in the video game apparatus 100 OFF (updates the flag to "0") (step S209). The control unit 103 determines whether the standby information transmitted from the server apparatus 200 has been received (step S210). When having determined that the standby information has been received, the control unit 103 updates information on the local player character stored in the video game apparatus 100 and the other-player-character information 510 based on the contents of the standby information (step S211).

The control unit 103 determines whether ⅓₀ sec is elapsed from the battle process or from the previous ⅓₀ sec (step S212). When it is determined that ⅓₀ sec is elapsed, the control unit 103 displays on the display screen 122 a display image generated by perspective transformation of space above the battle field where the local player character is present (step S213). After the display image is displayed in step S213, or after it is determined that ⅓₀ sec is not elapsed in step S212, the control unit 103 determines whether the battle start information transmitted from the server apparatus 200 has been received (step S214).

When having determined that the battle start information has not been received yet, the control unit 103 executes the stand-by-for-battle process (step S215). In the stand-by-for-battle process on the video game apparatus 100, for example, an input of a message associated with the chat function, a process associated with data transmission/reception, update of the equipment information 508 associated with updating the equipment of the player character, if changed, and a process of transmitting the changed content to the server apparatus 200, or a process associated with the action of the player character according to input information associated with the player's manipulation of the input device 163 in case of practicing the action of the player character in the battle is executed. After the stand-by-for-battle process, the control unit 103 returns to step S210.

When it is determined in step S201 or step S214 that the battle start information has been received, the control unit 103 executes the in-battle process (step S216), and terminates the battle process. Because this in-battle process is not related to the invention, its description will be omitted.

The following will describe playback of a movie before a battle in the network game, termination of the playback, and the situation in standby mode by way of specific examples of the display image displayed on the display screen 122 of the video game apparatus 100 included in the network game system according to the embodiment. FIGS. 8A to 8E are diagrams showing specific examples of images displayed on the display screens 122 of individual video game apparatuses prior to a battle against the opponent character.

Figure 8A:
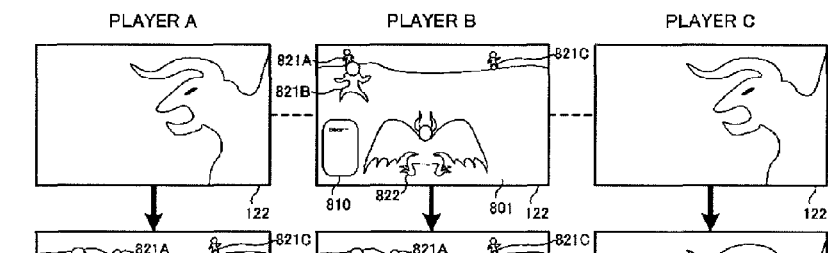
FIGS. 8A to 8E are diagrams showing specific examples of display screens of individual video game apparatuses prior to a battle.
Figure 8B:
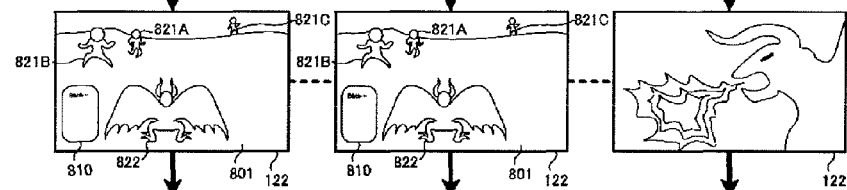
Figure 8C:
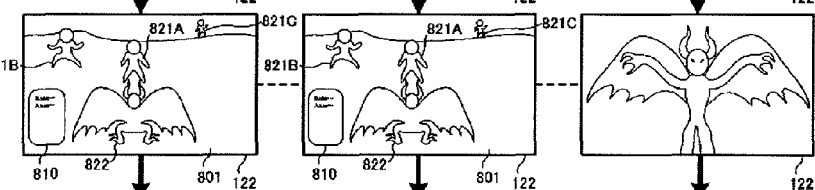
Figure 8D:
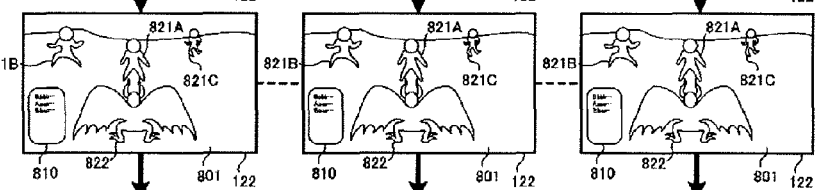
Figure 8E:
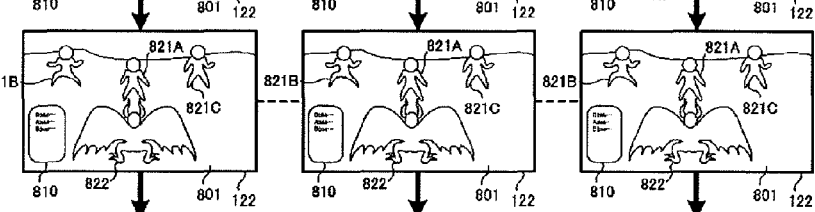

FIGS. 8A to 8E show a player A, a player B and a player C as the players who manipulate the respective video game apparatuses 100 on the assumption that there are three player characters composing a party. FIG. 8A shows the display screens 122 of the individual video game apparatuses 100 at the same timing. FIG. 8B shows the display screen 122 of each video game apparatus 100 at a timing later than the timing in FIG. 8A. Likewise, FIG. 8C shows the display screen 122 of each video game apparatus 100 at a timing later than the timing in FIG. 8B, FIG. 8D shows the display screen 122 of each video game apparatus 100 at a timing later than the timing in FIG. 8C, and FIG. 8E shows the display screen 122 of each video game apparatus 100 at a timing later than the timing in FIG. 8D.

In the specific examples, the player B performs the movie skipping operation earliest after playback of the movie has started, so that the display screen 122 of the video game apparatus 100 associated with the player B enters the battle standby mode. As the player A performs the movie skipping operation next, the display screen 122 of the video game apparatus 100 associated with the player A enters the standby mode. In the remaining part of the movie after the playback of the movie is terminated through the movie skipping operation by the player A, a hint on the attribute of the opponent character against which the battle will be engaged is viewed. As the video game apparatus 100 associated with the player C plays back the movie to the end, the display screen 122 of the video game apparatus 100 associated with the player C enters the standby mode last.

At the timing shown in FIG. 8A, the display screen 122 of the video game apparatus 100 associated with the player B who has performed the movie skipping operation earliest is already in standby mode, and a message board 810 which is used for chatting, and an opponent character 822 and a player character 821B of the player B both on a battle field 801 are displayed on the display screen 122. In contrast, the display screens 122 of the video game apparatuses 100 associated with the other players A, C keep playing back the movie.

Since the player B has terminated the movie earliest, the display screen 122 of the video game apparatus 100 which is manipulated by the player B shows the player character 821B associated with player B placed in a battle position distant from the opponent character 822, and displays a display image showing that condition. Player characters 821A, 821C of the players A, C who keep playing back the movie on the respective video game apparatuses 100 are displayed smaller than the player character 821B outside the battle field 801.

At the timing shown in FIG. 8B, as the player A performs the movie skipping operation, the display screen 122 of the video game apparatus 100 associated with the player A and the display screen 122 of the video game apparatus 100 of the player B display the way the player character 821A of the player A moves to a battle position on the battle field 801 from outside the battle field 801. While the video game apparatus 100 which is manipulated by the player C keeps playing back the movie, a display image which gives a hint on the attribute of the opponent character 822 is displayed, enabling only the player C to view the hint.

At the timing shown in FIG. 8C, a standby state where the player character 821A of the player A is placed in a battle position is displayed on the display screen 122 of the video game apparatus 100 which is manipulated by the player A. This battle position is close to the opponent character because the termination of the movie through the movie skipping operation by the player A is second to the termination of the movie done by the player B. The player character 821C of the player C who has not terminated playing back the movie is displayed smaller than the player characters 821A, 821B who are already in standby mode and are placed in battle positions on the battle field 801.

Update information of the equipment information 418 which is stored in the character management table 410 of the server apparatus 200 by changing the equipment of the player character 821 in standby mode is not transmitted until the battle start information immediately before starting the battle is transmitted to each video game apparatus 100. Even when any one of the players A, B changes the equipment of his/her own player character 821, thereby changing the form of the player character 821 on the display screen 122, a change in the form of the player character 821 originated from a change in the equipment may not be displayed on the display screens 122 of the video game apparatuses 100 which are manipulated by the other players.

At the timing shown in FIG. 8D, the video game apparatus 100 which is manipulated by the player C finishes playing back the movie to the end, and the display screen 122 of this video game apparatus 100, like the display screens 122 of the video game apparatuses 100 of the players A, B, displays the way the player character 821C of the player C moves to a battle position on the battle field 801 from outside the battle field 801.

At the timing shown in FIG. 8E, a display image showing all the player characters 821 including the player character 821C of the player C placed in battle positions on the battle field 801 is displayed on the display screens 122 of all the video game apparatuses 100. Because the video game apparatus 100 of the player C has played back the movie to the end, the battle position of the player character 821C is distant from the opponent character 822.

In the network game according to the embodiment, as described above, the server apparatus 200 manages the progress of a battle between a party composed of player characters 821 which are respectively manipulated by a plurality of players, and the opponent character 822. When a battle is accompanied with playback of a movie as pre-processing, the server apparatus 200 transmits the movie playback information to each video game apparatus 100 to permit the movie to be played back on the video game apparatus 100 of each of the players composing the party.

The video game apparatus 100 which has received the movie playback information displays the movie on its display screen 122, and transmits information indicative of the termination of the playback of the movie when the playback is terminated, to the server apparatus 200. On condition that the server apparatus 200 has received the information indicative of the termination of the playback of the movie from the video game apparatuses 100 of all the players composing the party, the server apparatus 200 simultaneously transmits the battle start information to execute the battle process at the same time to all the video game apparatuses 100.

As each player performs the movie skipping operation on the input device 163 of each video game apparatus 100, playback of the movie can be terminated halfway at the desired timing of the player. Until the battle process is executed on each video game apparatus 100, the video game apparatus 100 is in standby mode. This makes it possible to assure that all the players belonging to the same party which should progress with the game in cooperation of all the members engage in the battle in the progress of the game played by the individual players.

Because each player can chat with other players using the chat function in this standby mode, players experienced in the game who have viewed the movie several times may not be bored in spending the time until the battle takes place. In standby mode, each player can practice the action of his/her player character 821 by manipulating the input device 163 and change the equipment of the player character 821. For example, a player can permit the player character to make an action (e.g., deadly skill) involving a difficult manipulation in a battle, so that the player can spend the time without being bored until the battle starts.

Even when beginners in the game view the movie to the end, such viewing of the movie will not bother experienced players, thus encouraging the beginners to actively participate in the game. What a player can do in standby mode is not only chatting, but also changing the equipment of his/her player character 821, so that the player can elaborately prepare for the battle with the opponent character 822.

The player characters 821 composing the party are displayed on the display screen 122 of each video game apparatus 100 in standby mode, the player characters 821 which are in standby mode are placed on the battle field 801, whereas the player character 821 which has not yet terminated playing back the movie on the video game apparatus 100 is placed outside the battle field 801, and is displayed smaller than the player characters 821 placed on the battle field 801. The player characters 821 placed outside the battle field 801 moves in a manner of appearing on the battle field 801 to a battle position according to the order the playback of the movie is terminated when playback of the movie on the video game apparatus 100 is terminated.

The same condition in standby mode is displayed on the display screen 122 of any video game apparatus 100 which is set in the standby mode (though practice in the action of the player character 821 which reflects the manipulation by each player in standby mode, and a change in display originated from a change in equipment are not displayed), so that it is possible to easily see, through the display device, which one the players composing the party is the player of a video game apparatus 100 in standby mode, or the player who is playing back the movie. In other words, a player character which is still in standby mode and is not displayed on the display screen 122 means that its player has not terminated viewing the movie, so that other players who are still watching the movie can be identified easily.

When the members of the same party for a long period of time play the game to fight battles as mentioned above a number of times, individual players are likely to see the tendency of each player such that some players tend to always terminate a movie quickly or tend to always view a movie longer. This display of a screen where only the player characters of the players who have terminated viewing a movie appear is helpful in establishing communication with the players with one another, such as prompting a player who is always viewing a movie longer to skip the movie quickly.

Because the player characters 821 appearing on the battle field 801 appear in the order the playback of a movie is terminated, the players can get the feeling of being in live about a battle which will take place soon, making the game fun even in standby mode to wait for the initiation of the battle.

Whether the player character 821 appearing on the battle field 801 is placed in a battle position advantageous over the opponent character 822 (the first or third player to terminate viewing the movie) or is placed in a battle position disadvantageous over the opponent character 822 (the second player to terminate viewing the movie) varies depending on the order the players terminate viewing the movie. This gives a strategic aspect to the timing at which each player terminates the movie (including skipping the movie halfway and playing back the movie to the end), improving the entertainment of the game.

The individual player characters 821 and the opponent character 822 have their own attributes which have a what is called three-way standoff relation. This provides an advantage/disadvantage relation between the player characters 821 and the opponent character depending on the attributes. Accordingly, even if a battle position is disadvantageous over the opponent character, the relation in attribute between the player character 821 and the opponent character 822 may be advantageous over the opponent character 822, thus giving a strategic aspect to the timing at which each player terminates the movie and which determines the battle position. This further improves the entertainment of the game.

Depending on a movie, an image which gives a hint on the opponent character 822 (attribute of the opponent character 822) with which the player characters 821 will fight a battle to be engaged later may be displayed while the movie is played back. So, a player who has seen such an image to be a hint may progress with a subsequent battle more advantageously than a player who has skipped the movie before the image to be a hint is displayed. Accordingly, a strategy of allowing a player to decide whether to perform the movie skipping operation to terminate the playback of the movie before viewing an image to be a hint or to view such an image is added to the strategy of determining the timing of terminating the movie, thus further improving the entertainment of the game.

When a player performs a movie skipping operation on each video game apparatus 100, the skip input information is transmitted to the server apparatus 200 as information indicating the end of the movie, whereas when the movie is played back to the end, the end-of-movie information is transmitted to the server apparatus 200 as information indicating the end of the movie. Every time the server apparatus 200 receives the information, the server apparatus 200 does not transmit information on the mode of each player character 821 (information on the action, equipment, etc.) to each video game apparatus 100 except for transmission of standby information to each video game apparatus 100 in standby mode. As a result, although the server apparatus 200 reduces the amount of transmission of, or the number of transmissions of, information associated with the display in standby mode, each video game apparatus 100 will know whether the player characters 821 composing the party are playing back a movie or are in standby mode, thus relieving the load on the processing of the server apparatus 200.

The invention is not limited to the foregoing embodiment, and may be applied in various other forms. Modifications of the embodiment to which the invention is adaptable will be described below.

In the network game according to the embodiment, when a given period of time elapses after the server apparatus 200 receives information on the end of playback of a movie from the video game apparatus 100 that has terminated playing back the movie last, and then transmits standby information associated with the player character of this video game apparatus 100 to the video game apparatuses 100 of all the player characters composing a party, the server apparatus 200 transmits battle start information to synchronize the start of a battle. Instead of this synchronization, after reception of standby information associated with the player character 821 of the video game apparatus 100 that has terminated playing back the movie last, each video game apparatus 100 may measure a predetermined period of time from the transmission time included in the received information, and the elapse of the given period of time is set as the timing for starting a battle. This scheme can reduce the amount of data transmitted from the server apparatus 200, thus relieving the load on the processing of the server apparatus 200.

In the network game according to the embodiment, as a movie is skipped, the server apparatus 200 transmits standby information to each video game apparatus 100 in standby mode. Instead of this approach, the standby information may be transmitted to the video game apparatus 100 that is playing back a movie. At this time, upon reception of the standby information, the video game apparatus 100 that is playing back the movie may update various kinds of data based on the standby information, and continue to play back the movie.

In the network game according to the embodiment, a movie skipping operation is performed using the input device 163 to skip a movie without playing it back to the end. Instead of this scheme, a player may previous set his/her own video game apparatus 100 to automatically skip a movie when playback of the movie starts on the video game apparatus 100 (i.e., to automatically terminate the movie at the same time as playback of the movie starts). A player may be able to set information indicating that playback of a movie on his/her own video game apparatus 100 is unnecessary in the server apparatus 200 beforehand.

In the network game according to the embodiment, when a movie before a battle is skipped so that the player character 821 is in standby mode, it is possible to change the equipment of the player character 821 and practice the action thereof. If there is another player character 821 in standby mode, however, the equipment of the former player character 821 and the equipment of the another player character 821 may be set to be exchangeable with each other. When an item or the like to recover the HP of a player character is available in addition to the equipment, the player of this player character may exchange such an item with another item owned by the player of another player character 821 in standby mode.

In the network game according to the embodiment, the battle positions of the player characters 821 composing a party are decided by the order (skipping operation, playback of the movie to the end) in which playback of a movie on the video game apparatuses 100 of the individual player characters 821 have been terminated, and any player character 821 which has terminated playing back the movie earlier is set in standby mode until playback of the movie on every video game apparatus 100 is terminated. Instead of this approach, each player may set the equipment of his/her own player character 821 before a battle, and the battle positions of the player characters 821 may be decided by the order of finishing the setting of the equipment (specifically, the order in which a player performs an operation to indicate the end of the setting using the input device 163, and input information transmitted based on the input information is processed by the server apparatus 200).

Although the types of modes of battle positions in a battle are not particularly discussed in the foregoing description of the network game according to the embodiment, there may be plural types of modes of battle positions. Although the foregoing embodiment has been explained by way of example where there are three player characters 821, the number of the player characters 821 may be four or more. This modification ensures diversification of the types of modes of battle positions, thus increasing available choices for the battle position where the player will place his/her own player character 821. This improves the entertainment of the game.

When there are plural types of modes of battle positions this way, the mode of the battle position may be set to any one of the modes of battle positions before a movie is played back, or may be determined at random battle by battle. The mode of the battle position that is determined at random may be displayed as a hint in the display image in the movie which is being played back.

In the network game according to the embodiment, a battle is fought with the number of opponent characters 822 being one. Of course, the number of opponent characters 822 in a battle may be two or more. The advantage/disadvantage of the battle position of a player character 821 over each of the opponent characters 822 in a battle may vary according to the deployment of a plurality of opponent characters 822 on the battle field 801.

When a battle involving three player characters 821 composing a party and two opponent characters 822, for example, the player characters 821 can take more complicated battle positions, such as battle positions distant from one opponent character 822 but close to the other opponent character 822, or battle positions reversed to the former battle positions, or battle positions distant from both opponent characters 822 or close to both other opponent characters 822. This expands the strategy for each player in deciding which battle position his/her own player character 821 should take, i.e., in deciding at which timing playback of a movie should be terminated, thereby further improving the entertainment of the game.

There may be plural types of opponent characters 822 which may have different damage levels and different magnitudes of the values of HP. The deployment of such plural types of opponent characters 822 on the battle field may be determined according to the combination of the opponent characters in fighting a battle. The battle positions may be determined at random battle by battle. The types and deployment of the opponent characters 822 may be displayed as a hint in a display image while the movie is being played back.

Although a plurality of player characters 821 composing a party battle against the opponent character 822 in a battle to defeat the opponent character 822 in the foregoing embodiment, parties each composed of a plurality of player characters 821 may battle against each other in addition to, or instead of the way of fighting a battle in the embodiment. In this case, a same event (playback of a movie, or the like) may be performed with respect to all the player characters 821 which participate in the battle, or different events may be performed party by party. In this case, the battle should start on condition that events associated with all the player characters 821 are terminated. Accordingly, the advantage/disadvantage of the battle positions of the local player characters in one party varies according to the deployment of the player characters 821 of the opponent party. As a result, the entertainment of the game is improved further.

Although the display screen 122 of the video game apparatus 100 that is still playing back a movie does not show other than an image associated with the movie being played back (e.g., the image being the message board 810 for chatting), the number of players who have already skipped the movie may be displayed at a corner of the display screen 122 without dropping the visibility of the movie. Because the timing at which a player performs a movie skipping operation is associated with the decision on the battle position of his/her own player character 821, displaying the number of players who have already skipped the movie this way further expands the strategy for each player in the movie skipping operation, thus improving the entertainment of the game.

In the network game according to the embodiment, some battles are engaged after a movie is played back. However, the network game according to the embodiment is applicable to a case where tutoring of a battle is carried out instead of playing back a movie, or together with playback of a movie. Accordingly, a beginner on the game checks the tutorial once, whereas a player who has checked the tutorial and is associated with a player character belonging to the same party as the beginner need not see it again, and can be relieved of the troublesome restraint. In the period where a player skips the tutorial and waits for other players, the player can change the equipment or practice the action of his/her own player character, so that the player will not be bored waiting for other players and can effectively use the standby period.

Although a plurality of player characters 821 cooperate with one another to progress with the game, and battle with an opponent character 822 after playback of a movie in the network game according to the embodiment, the invention may be adapted to any game which needs synchronization for the progress of the game after an event such as playback of a movie is performed. For example, the invention is adaptable to a race (such as car race or horse race) which actually starts after some event associated with the race is performed, or sports (such as soccer or baseball) whose game is actually played after some event associated with the game.

In the network game according to the embodiment, a race or sports may be played as a minigame in addition to execution of a battle. In this case, the aforementioned tutoring may be carried out before this minigame. The starting positions or the like may be decided for a race, or the positions or the like of players may be decided for sports, according to the order of the players terminating the event.

An MMORPG has been explained as a network game by way of example in the foregoing description of the embodiment. Of course, the invention may be adapted to even a simulation game where multiple players can participate as long as the game is a network game which involves changes in the progress of the game, such as a battle and an event (playback of a movie, tutoring, or the like).

According to the embodiment, the video game apparatus 100 or a dedicated game apparatus is used as a device which becomes the platform to play a video game. According to the invention, however, a general-purpose personal computer or the like which includes components similar to those of the video game apparatus 100 and has a network connecting capability may be constructed a platform. A portable game apparatus (including a cellular phone having a capability of running applications) which is configured to have the display device 121 and the sound output device 125 accommodated in the same casing as the casing of the main body 101.

A semiconductor memory card may be adopted as the recording medium 131 in place of a DVD-ROM or CD-ROM. A card slot where the memory card is inserted may be provided in placed of the DVD/CD-ROM drive 113. In case of a general-purpose personal computer, the program and data according to the invention may be provided in the form of being prestored on the HDD 107, not stored in the recording medium 131. Any recording medium may be optionally used to store and provide the program and data according to the invention according to the physical form of the hardware and the distribution form.

According to the embodiment, the program and data for the video game apparatus 100 are stored in the recording medium 131 for distribution. Instead, the program and data may be stored on a fixed disk apparatus included in the server apparatus located on a network, and distributed to the main body 101 via the network. The video game apparatus 100 can save the program and data, received at the communication interface 115 from the server apparatus 200, in the HDD 107, and load them into the RAM 105 at the time the program is run.

What is claimed is:

1. A non-transitory computer readable recording medium including a program which is executable by a computer for causing the computer to perform operations including:
   receiving, by a receiver, an input from a player who uses the computer;
   communicating, by a transmitter, with other computers on a network;
   storing, in a memory and for the computer and each of the other computers, information representing whether a movie is being played back;
   displaying, on a display device included in the computer, when a predetermined event generation condition for executing a virtual character battle in a game is met during the game, the movie, termination of a display of the movie being enabled in accordance with the input from the player, the computer and each of the other computers participating in the virtual character battle during the game via the network;
   setting, in the memory and for the computer and each of the other computers, the information to represent that the movie is being played back when the predetermined event generation condition for executing the virtual character battle in the game is met during the game;
   terminating, by a processor, the display of the movie in accordance with the input from the player;
   setting, in the memory and for the computer, the information to represent that the movie is not being played back when the display of the movie is terminated in accordance with the input from the player;
   setting, in the memory and for each of the other computers, the information to represent that the movie is not being played back when an input on termination is received from each corresponding one of the other computers via the network; and executing, by the processor, the virtual character battle during the game after the display of the movie has been terminated by the processor and by each of the other computers, wherein the movie comprises a dynamic image relating to the virtual character battle, the virtual character battle following the termination of the display of the movie, the movie is displayed on the computer and each of the other computers, and the computer and each of the other computers terminates the display of the movie by operating an input device before a given period elapses.

2. The non-transitory computer readable recording medium according to claim 1, wherein the transmitter receives information for executing a processing during the virtual character battle, the processing being executable by the computer and the other computers at a same time.

3. The non-transitory computer readable recording medium according to claim 1, wherein the processor executes the virtual character battle after the display of the movie is terminated on all computers which participate in the virtual character battle.

4. The non-transitory computer readable recording medium according to claim 1, wherein the display device displays a status image which shows a display status of the movie or a termination status of the display of the movie on the other computers.

5. The non-transitory computer readable recording medium according to claim 1, wherein the processor terminates the display of the movie when a predetermined time has elapsed.

6. The non-transitory computer readable recording medium according to claim 1, wherein the movie includes a hint for the virtual character battle.

7. The non-transitory computer readable recording medium according to claim 1, wherein a first computer of the computer and the other computers which terminates the display of the movie quickest receives an advantage during the virtual character battle.

8. The non-transitory computer readable recording medium according to claim 7, wherein a second computer of the computer and the other computers which terminates the display of the movie less quick than the first computer receives a disadvantage during the virtual character battle.

9. The non-transitory computer readable recording medium according to claim 1, wherein battle positions of the computer and each of the other computers are decided by an order in which playback of the movie is terminated.

10. The non-transitory computer readable recording medium according to claim 1, wherein a frequency of events of the computer and each of the other computers in the virtual character battle is decided by an order in which playback of the movie is terminated.

11. The non-transitory computer readable recording medium according to claim 10, wherein the events include attacks.

12. The non-transitory computer readable recording medium according to claim 1, wherein one of the computer and the other computers which terminates the display of the movie second quickest receives a disadvantage during the virtual character battle.

13. A game apparatus connected to a network game system with other game apparatuses, the game apparatus comprising:

a receiver that receives an input from a player who uses the game apparatus;

a transmitter that communicates with the other game apparatuses on a network;

a memory that stores, for the game apparatus and each of the other game apparatuses, information representing whether a movie is being played back;

a display device that, when a predetermined event generation condition for executing a virtual character battle in a game is met during the game, displays the movie, termination of a display of the movie being enabled in accordance with the input from the player, the game apparatus and each of the other game apparatuses participating in the virtual character battle during the game via the network;

a processor that sets, in the memory and for the game apparatus and each of the other game apparatuses, the information to represent that the movie is being played back when the predetermined event generation condition for executing the virtual character battle in the game is met during the game;

the processor that terminates the display of the movie in accordance with the input from the player;

the processor that sets, in the memory and for the game apparatus, the information to represent that the movie is not being played back when the display of the movie is terminated in accordance with the input from the player;

the processor that sets, in the memory and for each of the other game apparatuses, the information to represent that the movie is not being played back when an input on termination is received from each corresponding one of the game apparatuses via the network; and the processor that executes the virtual character battle during the game after the display of the movie has been terminated by the processor and by each of the other game apparatuses, wherein the movie comprises a dynamic image relating to the virtual character battle, the virtual character battle following the termination of the display of the movie, the movie is displayed on the game apparatus and each of the other game apparatuses, and the game apparatus and each of the other game apparatuses terminates the display of the movie by operating an input device before a given period elapses.

14. A network game system including a plurality of computers, each computer of the plurality of computers comprising:

a receiver that receives an input from a player who uses the computer;

a transmitter that communicates with other computers of the plurality of computers on a network;

a display device that, when a predetermined event generation condition for executing a virtual character battle in a game is met during the game, displays a movie, termination of a display of the movie being enabled in accordance with the input from the player, the computer and each of the other computers participating in the virtual character battle during the game via the network;

a processor that terminates the display of the movie in accordance with the input from the player; and the processor that executes the virtual character battle during the game after the display of the movie has been terminated by the processor and by the other computers, at least one of the plurality of computers further comprising:
- a memory that stores, for each computer of the plurality of computers, information representing whether the movie is being played back;
- the processor that sets, in the memory and for each computer of the plurality of computers, the information to represent that the movie is being played back when the predetermined event generation condition for executing the virtual character battle in the game is met during the game;
- the processor that sets, in the memory and for the one of the plurality of computers, the information to represent that the movie is not being played back when the display of the movie is terminated in accordance with the input from the player; and
- the processor that sets, in the memory and for the other computers, the information to represent that the movie is not being played back when an input on termination is received from each corresponding one of the other computers via the network, wherein the movie comprises a dynamic image relating to the virtual character battle, the virtual character battle following the termination of the display of the movie, the movie is displayed on the computer and each of the other computers, and the computer and each of the other computers terminates the display of the movie by operating an input device before a given period elapses.

* * * * *